United States Patent [19]

Miller

[11] Patent Number: 4,654,098
[45] Date of Patent: Mar. 31, 1987

[54] RADIANT HEAT REFLECTIVE INFLATABLE STRUCTURE AND METHODS FOR MAKING SAME

[75] Inventor: David D. Miller, Bricktown, N.J.

[73] Assignee: The Garrett Corporation, Los Angeles, Calif.

[21] Appl. No.: 721,539

[22] Filed: Apr. 10, 1985

Related U.S. Application Data

[62] Division of Ser. No. 463,772, Feb. 4, 1983, Pat. No. 4,582,734.

[51] Int. Cl.⁴ .............................................. B31F 5/00
[52] U.S. Cl. .................................... 156/157; 156/182; 156/280; 156/307.3; 182/47; 182/48; 193/25 B; 244/137 P; 244/DIG. 2; 428/12; 428/57; 428/920

[58] Field of Search ............ 156/157, 280, 182, 307.3; 244/137 P, DIG. 2; 182/47, 48; 193/25 B; 428/12, 920, 57

[56] References Cited

U.S. PATENT DOCUMENTS

| | | | |
|---|---|---|---|
| 2,384,269 | 9/1945 | Bake | 156/315 |
| 3,591,400 | 7/1971 | Palmquist et al. | 428/920 |
| 4,332,049 | 6/1982 | Fisher | 244/DIG. 2 |

FOREIGN PATENT DOCUMENTS 1371943 10/1974 United Kingdom ................ 156/157

Primary Examiner—John J. Gallagher
Attorney, Agent, or Firm—Terry L. Miller; Albert J. Miller

[57] ABSTRACT

Radiant head resistant fluid-distendable structure and methods for making same.

6 Claims, 3 Drawing Figures

RADIANT HEAT REFLECTIVE INFLATABLE STRUCTURE AND METHODS FOR MAKING SAME

BACKGROUND OF THE INVENTION

This is a division of application Ser. No. 463,772 filed Feb. 4, 1983; now U.S. Pat. No. 4,582,734.

The field of this invention is inflatable structure, such as inflatable life rafts and inflatable aircraft escape slides, and methods for making such structure. More particularly, this invention relates to such inflatable structure which is especially resistant to loss of inflation integrity caused by exposure to intense radiant heat energy. Such radiant heat energy may result from an aircraft fuel fire.

Modern commercial passenger aircraft are equipped with one or more inflatable escape slides. Such escape slides are deflated and folded for storage in or adjacent to the various doors of the aircraft. After an emergency landing such slides are rapidly deployed and inflated. The aircraft passengers and crew may safely escape from the aircraft by sliding down the inflated slides to reach the earth.

Further, when an aircraft is ditched in water the passengers and crew may slide from the aircraft into the water by using the inflated slides. After the passengers and crew have escaped from the aircraft, the escape slides may be separated from the aircraft for use as life rafts. Consequently, many conventional escape slides are especially designed and constructed to serve well in the dual capacity of escape slide and life raft.

Because of the potential for use of escape slides as life rafts, many conventional escape slides have been constructed principally of nylon fabric which is airproofed with an inner and outer coating of thermosetting polymer such as neoprene. The outer neoprene coating is pigmented to produce a yellow, red or orange color which is highly visible upon the surface of the sea. Such high visibility of the escape slide in its use as a life raft promotes rapid location of the raft and rescue of the passengers.

However, the structure of an aircraft is sometimes damaged during an emergency landing or ditching so that fuel leaks from the aircraft. Such leaking fuel is frequently ignited. While the resulting fuel fire may be of a limited nature so that one or more of the inflated aircraft escape slides are separated from the fuel fire and lead to safety for the passengers, such a fire nevertheless jeopardizes even distant escape slides. Such is the case because a fuel fire may be very intense, generating high temperatures and liberating intense radiant heat energy. The radiant heat energy impinging upon the inflated escape slides rapidly heats both the flexible material from which the slide is made and the inflation gas therein. As a result, the internal inflation pressure may increase at the same time that the slide fabric is heated and weakened. Of course, such a combination of factors eventually results in a breach in the inflated escape slide and rapid deflation.

Ironically, it has been discovered that the high-visibility coloration of conventional escape slides greatly increases the rate at which the inflated slides absorb radiant heat energy from a fuel fire. The radiant heat flux from a fuel fire may be so intense that conventional escape slides are destroyed in just a few seconds time. For example, a conventional escape slide may endure for only 90 to 120 seconds when exposed to a radiant heat flux of 1.5 BTU/ft$^2$-sec. The endurance of such a conventional slide may be as short as 40 to 50 seconds if the radiant heat flux reaches a more intense level of 2.0 BTU/ft$^2$-sec.

The usual mode of failure of a conventional escape slide when exposed to radiant heat flux is charring of the thermoset neoprene and a localized loss by the nylon fabric of its ability to hold inflation air pressure. Attempts have been made to improve the air holding ability and heat resistance of conventional escape slides by painting them with an aluminized paint. However, these attempts have met with little success. It is believed that the conventional high-visibility pigmented fabric continues to be absorptive of radiant heat energy despite an overcoat of somewhat reflective aluminized paint.

Moreover, a conventional aircraft escape slide may be destroyed at a time and under conditions such that its mere destruction leads to passenger injuries or deaths even though other routes of escape may be available. After witnessing the destruction of an aircraft escape slide, which is an apparent bridge to safety, passengers may be left to escape a burning, smoke filled aircraft by whatever route is open to them. Such a situation promotes panic and rash behavior leading to injuries or death which cool-headed conduct might have prevented. Accordingly, it is desirable that the escape slides of an aircraft endure as long as possible both to provide a route of escape for the passengers and to avoid the panic which may result when an escape slide fails.

Growing recognition of the vulnerability of conventional aircraft escape slides to destruction by radiant heat flux has lead a major airframe manufacturer to express a need for escape slides which are resistant to radiant heat flux. Further, such recognition may result in the promulgation by the F.A.A. of official guidelines and standards for radiant heat resistance of escape slides for commercial passenger aircraft. A precursor of such guidelines is seen in A.S.T.M. draft standard 07.06-12-2 which is applicable to radiant heat testing of fabrics for escape slides.

U.S. Pat. Nos. 3,935,607 and 4,083,070 are believed to relate to inflatable structures; while U.S. Pat. Nos. 2,759,522; 3,092,530; and 3,591,400 are believed to relate to materials which are resistant to radiant heat energy.

SUMMARY OF THE INVENTION

The present invention provides inflatable structure which is substantially reflective of radiant heat energy and resistant to destruction by such heat energy, and method for making such structure. More particularly, the invention provides a structure having an inflatable portion fabricated principally of flexible air impermeable fabric having an outer face which is substantially reflective of radiant heat energy. The inflatable portion is made by adhesively securing together pieces of the heat resistant fabric to define lap seams therebetween. Such lap seams are coated with a layer of material which carries metallic particles reflective to heat energy to provide further protection thereto.

Further, because experience has shown that the seams of an inflatable structure are particularly vulnerable to destruction by radiant heat flux, the present invention provides a method of making seams which are more resistant to radiant heat energy than any known heretofore.

Accordingly, the present invention may be defined as an inflatable structure such as an aircraft escape slide or the like having an inflatable portion comprising a first and a second contiguous pieces of flexible fabric in part defining said inflatable portion, each of said first and said second fabric pieces being substantially free of radiant heat absorptive pigment and carrying an inner coating of thermoplastic polymer rendering said fabric pieces air impermeable, said inner coating also being substantially free of radiant heat absorptive pigment, said first and said second fabric pieces further having an outer coating of thermoplastic polymer carrying radiant heat reflective metallic particles therein, said first and said second fabric pieces being partially overlapped and adhesively secured sealingly together to define a lap seam therebetween, and at least a single observe overcoating of thermoset polymer covering said lap seam and carrying radiant heat reflective metallic particles therein.

DETAILED DESCRIPTION OF THE PREFERRED EMBODIMENT

Figure 1:
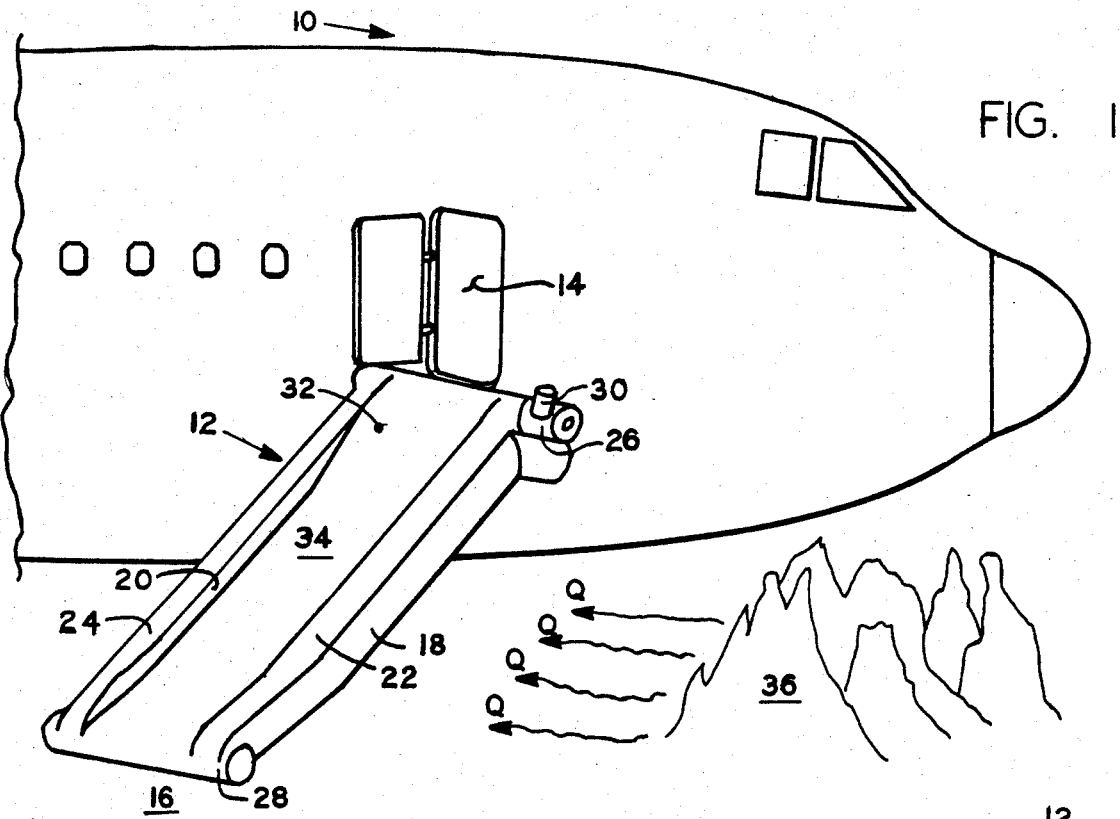
FIG. 1 is a fragmentary pictorial depiction of a commercial passenger aircraft with an escape slide thereof inflated and deployed for passenger use while being exposed to radiant heat flux from a fuel fire.

Viewing FIG. 1, an aircraft 10 (only a portion of which is illustrated) is depicted following an emergency landing with an inflated escape slide 12 extending from below a door opening 14 of the aircraft to a lower surface 16, such as a runway surface or the earth. The escape slide 12 when inflated as shown is a semirigid structure comprising a pair of elongate spaced apart body tubes 18,20 which are joined respectively with a pair of similarly elongate and spaced apart guide tubes 22,24. The body tubes 18,20 are spaced apart by a transverse sill beam 26 which rests against the aircraft exterior and also by a transverse runway beam 28 resting upon the surface 16. Both the sill beam 26 and runway beam 28 are tubular constructions similar in construction to and in fluid pressure communication with the body tubes 18,20 and guide tubes 22,24. The sill beam 26 or one of the body tubes 18,20 or guide tubes 22,24 includes an apirator 30 for inflation of the inflatable structure. Body tubes 18,20 and sill tube 26 along with runway tube 28 support among them a web 32 of flexible material defining a sliding surface 34. The sliding surface 34 extends from the door opening 14 to adjacent the surface 16 below and between the guide tubes 22,24 to define a trough for conducting evacuees from door 14 to surface 16. The details of the sliding surface 34, inflation of the structure 12, and attachment thereof to aircraft 10 are conventional and well-known and will not be described in further detail.

The escape slide 12 is made principally of flexible air impermeable material. When not inflated and deployed as shown in FIG. 1, the slide 12 is deflated and folded for storage within a compartment (not shown) adjacent to door opening 14. Thus, it is easily appreciated that the escape slide 12 is semirigid and useable by evacuees only when it is inflated and supported by internal air pressure.

Following an emergency landing, passengers and crew of the aircraft 10 may quickly escape therefrom and safely reach the surface 16 by sliding down the surface 34 so long as the escape slide 12 is inflated and supported by internal air pressure. However, as frequently happens during an emergency landing, fuel has leaked from the aircraft 10 and been ignited to cause an intense fire 36. The fire 36, while not immediately adjacent to escape slide 12 and some distance therefrom, nevertheless subjects to escape slide 12 to intense radiant heat energy (represented by arrows Q). Radiant heat Q impinges upon and heats the flexible material from which escape slide 12 is made as well as heating and increasing the pressure of the pressurized air within the escape slide. In view of the air-supported nature of the escape slide 12, it is easily seen that if the intense radiant heat Q deteriorates either the flexible material from which the slide 12 is fabricated or one of the many seams joining various component pieces of the material together sufficiently that the increased air pressure therein breaches the material or a seam, the slide 12 deflates and is rendered useless for emergency escape use.

Figure 2:
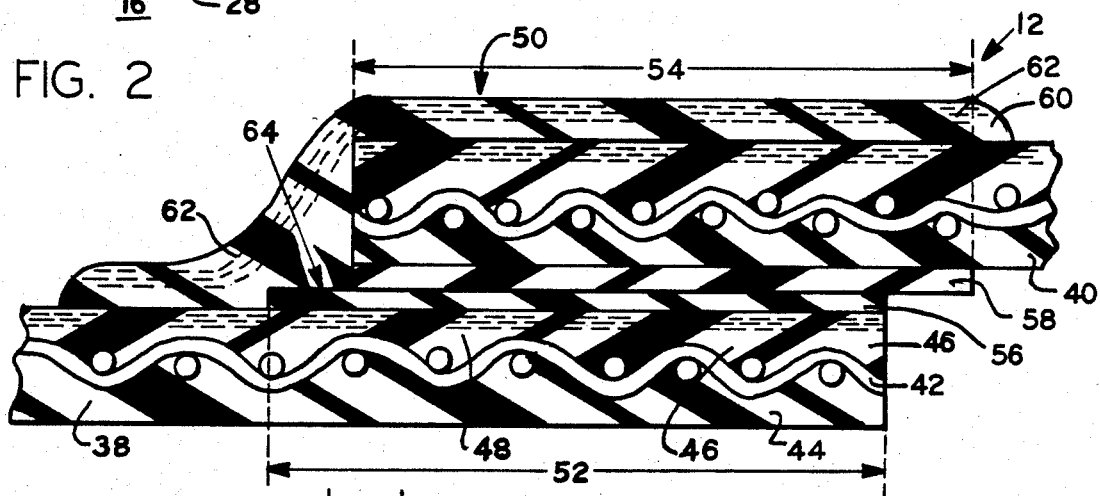
FIG. 2 diagrammatically depicts a cross sectional view taken transversely of a seam of an inflatable structure embodying the invention.

Viewing now FIG. 2 it can be seen that the escape slide 12 includes a first piece 38 and a contiguous second piece 40 of flexible material. The pieces 38 and 40 are cut to respective shapes accordingly to a pattern from a bulk supply of the flexible material for contiguous incorporation into the escape slide 12 to define a portion thereof. For example, the pieces 38 and 40 may define a portion of one of the body tubes 18,20 or guide tubes 22,24. Thus, the composition of the pieces 38 and 40 is identical so that only the piece 38 need be described in detail here.

Material piece 38 includes a foundation or substrate of single ply nylon fabric 42. The fabric 42 is a plain weave of 210/1 denier high tenacity nylon having a thread count of 82×58 warp and fill. The fabric 42 weighs about 3.7 oz./yd$^2$. Upon the fabric 42 is an inner coating 44 of natural or off white thermoplastic urethane polymer which renders the material air impermeable. Also carried by fabric 42 is an obverse outer coating 46 of thermoplastic urethane polymer carrying heat reflective metallic particles 48 dispersed therein. Preferably, the metallic particles 48 are flakes or platelets of aluminum. The inner and outer coatings 44 and 46 have a weight of approximately 2.0 and 0.5 oz./yd$^2$, respectively. The material pieces 38,40 are themselves able to withstand a radiant heat flux of 2.0 B.T.U./ft$^2$-sec. for at least 180 seconds while retaining adequate structural and air holding (inflation) integrity.

In order to join material pieces 38 and 40 one to the other, a lap seam which is generally referenced with the numeral 50 is defined therebetween. The lap seam 50 comprises respective marginal edge sections 52 and 54 of the material pieces 38 and 40 which are partially overlapped and sealingly secured together. The marginal edge sections 52 and 54 each are entirely coated with a continuous layer of a cross linking urethane polymer adhesive, 56 and 58, respectively. The adhesive layer coatings 56 and 58 comprise a cured urethane polymer which in viscous liquid form is mixed with an accelerator immediately prior to its application to the material pieces 38 and 40. The accelerator contains an isocyanate which promotes cross linking both in the adhesive layers 56,58 as well as in the respectively adjacent urethane polymer coatings 46 and 44 of material pieces 38 and 40. As is more fully explained infra, the adhesive layers 56,58 engage one another and cross link with one another so that where they are overlapped the layers 56,58 fuse and cease to be distinguishable as separate adhesive layers. Adhesives and accelerators which have proven to be acceptable for use in the present invention are set forth in the table below:

| Adhesives | Accelerator |
|---|---|
| Shore-UBS Chemical Co. | |
| LB 020-1A | LB-020-A |
| LB 020-3 | LB-020-A |
| LB 020-5 | LB-020-A |
| Transworld Adhesives and Chemicals Corp. | |
| FA 562 | AC 142 |
| FA 532 | AC 142 |

As FIG. 2 depicts, further protection from radiant heat flux is provided at lap seam 50 by a reflective overcoat of a thermoset (i.e. cross linked) urethane polymer 60 which carries heat reflective metallic particles 62 dispersed therein. The overcoating 60 is continuous along the length of lap seam 50 (i.e. perpendicularly to the plane of FIG. 2) and extends from beyond the marginal edge section 54 of material piece 40 to terminate beyond (leftwardly) of the marginal edge section 52 of material piece 38. Thus, the overcoat 60 covers and conceals a portion 64 of adhesive coated marginal edge section 52 which would otherwise be exposed to radiant heat flux. As discussed supra, the radiant heat flux Q to which the material pieces 38 and 40 and seam 50 are exposed may reach an intensity of 2.0 B.T.U./ft²-sec., or more. Further, as set out above, the mass of the materials from which escape slide 12 is fabricated is not very great (about 6.2 oz/yd² for the material from which pieces 38 and 40 are made). Thus, it can be seen that an unprotected and relatively absorptive feature such as the adhesive margin 64 would cause a very rapid local temperature increase and burn through of the the material piece 38 if not for the protection provided by overcoat 60.

Another important aspect of the structure depicted by FIG. 2 is the absence of heat absorptive pigment in the material pieces 38,40 in conjunction with the radiant heat reflective metallic particles 48. It will be understood that the material pieces 38,40 are both partially reflective because of the metallic particles and partially transmissive (that is, translucent). Consequently, a portion of the heat flux Q is believed to be reflected while another portion is transmitted through without significantly heating the material pieces 38,40. Only a fraction of the heat flux Q is believed to be actually absorbed by pieces 38,40 to increase the temperature thereof. On the other hand, the layers of adhesive 56,58 at lap seam 50 are believed to increase the opacity of the structure (decrease its translucence) so that a greater fraction of radiant heat would be absorbed at seam 50 except for the overcoat 60. However, it is believed that the overcoat 60 cooperates with reflective particles 62 and with coatings 46 of pieces 38 and 40 and with the reflective particles 48 therein to increase the reflectivity of the structure 12 in the vicinity of seam 50. Preferably, the thermal reflectivety of structure 12 at seam 50 is approximately 85 percent.

Figure 3:
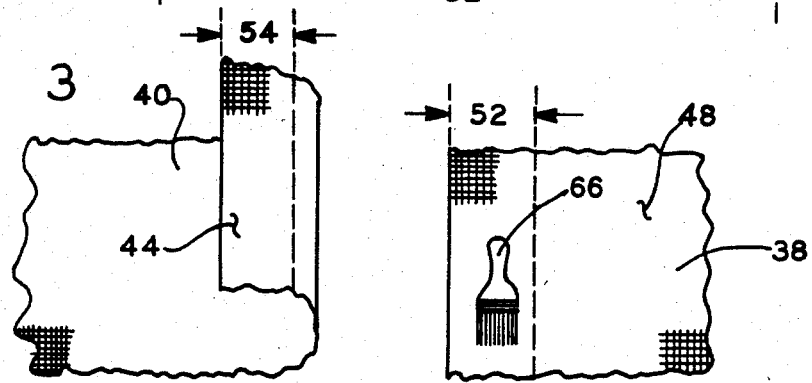
FIG. 3 diagrammatically illustrates a step in the making of a seam as illustrated by FIG. 2.

FIG. 3 depicts a step in the method of making a seam as illustrated in FIG. 2. In preparation to uniting the material pieces 38 and 40, the marginal edge sections 52,54 are each "painted" with three individual coats of a mixed adhesive and accelerator selected from the above table, as with a paint brush 66. About fifteen to twenty minutes is allowed to elapse between each coat of adhesive so that the adhesive layers 56,58 are built up to entirely cover the marginal edge sections with a coating of adhesive. While the adhesive layers 56,58 are yet aggressively tacky, the marginal edge sections 52,54 are overlapped by about three-fourth inch to contact layers 56,58 with one another. Immediately thereafter, a hard rubber roller or doctor blade is employed to force out any trapped air bubbles from seam 50 and to complete the intimate contacting of adhesive layers 56,58 with one another. After the lap seam 50 has been made, the overcoat 60 is applied in viscous liquid form, as with a paint brush. A material which has been found acceptable for the overcoat 60 is coating No. 20085B, which is available from Uretek, Inc. This material conforms with Federal Standard No. 595 for Silver Grey No. 17178 and has at least 40 percent solids when prepared for application. It has been found that a single uniform coating of the above material carefully applied with a paint brush will allow the lap seam 50 to endure a radiant heat flux of 2.0 BTU/ft²-sec. for at least 180 seconds.

While the present invention has been depicted and described by reference to a particular preferred embodiment thereof, no restriction upon the invention is implied by such reference and none is to be inferred. The invention is intended to be limited only by the scope and spirit of the appended claims which provide a definition of the invention.

I claim:

1. The method of making a structure for providing egress for persons from an elevated portal, such as the door of an aircraft upon a runway, and safe rapid transport to a lower surface such as that of the earth despite ambient radiant heat energy as great as 2.0 BTU/ft²-sec., said method including the steps of:

providing a flexible air impermeable fabric material which is able to endure said radiant heat energy for substantially 180 seconds while retaining adequate structural integrity and air impermeability;

forming at least two pieces of said fabric material to predetermined individual shapes for contiguous incorporation into the inflatable portion of a fluid distendable slide structure, said at least two fabric pieces defining a part of said inflatable portion, said slide structure being adapted when inflated to extend outwardly and downwardly at an angle from said portal to said lower surface;

adhesively securing said at least two fabric pieces sealingly one to the other to define a seam therebetween;

providing additional outward protection from radiant heat energy only at said seam; and utilizing each of the four above-recited steps in forming each seam of said inflatable portion of the slide structure which may in use of said slide structure be exposed to damaging radiant heat energy.

2. The method of claim 1 wherein said step of providing additional protection at said seam includes coating an obverse outer surface of said slide structure at said seam with a flexible thermosetting polymer material having reflective platelets of metal dispersed therein.

3. The method of claim 1 wherein said step of adhesively securing said at least two fabric pieces sealingly together includes coating a marginal edge portion of each of said at least two fabric pieces with a layer of cross linking adhesive, and intimately coengaging said adhesive coated marginal edge portions one with the other to engage and sealingly fuse said adhesive coatings together.

4. The method of claim 3 wherein said coating step includes applying at least two layers of said adhesive to each marginal edge portion with a determined time elapsing between successive applications of said adhesive, and engaging said adhesive coatings with one another while each is yet aggressively tacky.

5. The method of making a structure having an inflatable portion which when inflated to a predetermined pressure level is able to endure a radiant heat flux of approximately 2.0 BTU/ft$^2$-sec. for at least 180 seconds without significant loss of inflation and structural integrity, said method comprising the steps of:

provuding a flexible material from which to fabricate said inflatable portion, said material comprising polymeric fabric which is substantially free of heat absorptive pigment, said fabric having an inner coating of thermoplastic urethane polymer which is also substantially free of heat absorptive pigment, said inner coating rendering said fabric air impermeable, said fabric further having an obverse outer coating of thermoplastic urethane polymer carrying reflective metallic particles therein;

forming two separate pieces of said material to respective predetermined shapes for contiguous incorporation into said inflatable structure to define a portion of the latter, each of said two material pieces having a respective marginal edge portion thereof;

applying at least a single coating of a cross linking urethane polymer adhesive to said inner coating of one of said marginal edge portions and to said outer coating of the other of said marginal edge portions to cause at least partial local cross linking of said inner and outer urethane polymer coatings;

overlapping said marginal edge portions to intimately contact said adhesive coatings one with the other to define a lap seam between said two material pieces and further cross linking said adhesive coatings together; and applying at least a single layer of cross linking urethane polymer overcoating material which carries reflective metallic particles therein to all of said marginal edge portion of said one material pieces and to all obversely exposed marginal edge portion of said other material piece.

6. The method of claim 5 including the application of sufficient cross linking urethane polymer overcoating material to said lap seam to attain a thermal refectivity thereat of substantially 85 percentum.

* * * * *